United States Patent
Bush et al.

(10) Patent No.: US 9,654,218 B2
(45) Date of Patent: May 16, 2017

(54) RF INGRESS IN FIBER-TO-THE-PREMISES

(71) Applicant: Trilithic, Inc., Indianapolis, IN (US)

(72) Inventors: Terry W. Bush, Greenwood, IN (US);
Gary W. Sinde, Indianapolis, IN (US);
John J. Bush, Bargersville, IN (US)

(73) Assignee: Trilithic, Inc., Indianapolis, IN (US)

( * ) Notice: Subject to any disclaimer, the term of this patent is extended or adjusted under 35 U.S.C. 154(b) by 102 days.

(21) Appl. No.: 14/221,414

(22) Filed: Mar. 21, 2014

(65) Prior Publication Data

US 2014/0314407 A1 Oct. 23, 2014

Related U.S. Application Data (60) Provisional application No. 61/813,205, filed on Apr. 18, 2013.

(51) Int. Cl.
*H04B 10/2575* (2013.01)
*H04Q 11/00* (2006.01)

(52) U.S. Cl.
CPC ... *H04B 10/25751* (2013.01); *H04Q 11/0071* (2013.01); *H04Q 2011/0083* (2013.01)

(58) Field of Classification Search
CPC ....... H04B 10/025751; H04Q 11/0071; H04Q 2011/0083
See application file for complete search history.

(56) References Cited

U.S. PATENT DOCUMENTS

| | | | |
|---|---|---|---|
| 2002/0083476 A1* | 6/2002 | McNamara | H04N 7/17309 725/148 |
| 2008/0292314 A1* | 11/2008 | Lu | H04B 10/0773 398/58 |
| 2009/0047917 A1* | 2/2009 | Phillips | H03F 3/191 455/127.1 |
| 2009/0113511 A1* | 4/2009 | Lee | H04B 10/2507 725/129 |
| 2011/0283331 A1* | 11/2011 | Riggsby | H03F 3/62 725/106 |
| 2012/0044361 A1* | 2/2012 | Riggsby | H03H 7/48 348/192 |
| 2013/0125193 A1* | 5/2013 | Wells | H04N 7/17309 725/127 |
| 2014/0033264 A1* | 1/2014 | Li | H04N 21/61 725/127 |
| 2014/0301490 A1* | 10/2014 | Nielsen | H04B 3/50 375/257 |
| 2015/0138960 A1* | 5/2015 | Riggsby | H03F 3/195 370/228 |

* cited by examiner

*Primary Examiner* — Leslie Pascal
(74) *Attorney, Agent, or Firm* — Barnes & Thornburg LLP (57) ABSTRACT

In a communication network, a node at a subscriber premises includes an input/output (I/O) port, and a device for monitoring a subscriber premises. The device includes an upstream signal path including a first switch, a downstream signal path, and a controller having an input/output (I/O) port coupled to the I/O port of the node, and a first output port. The first switch is coupled to the first output port selectively to complete the upstream signal path.

16 Claims, 4 Drawing Sheets

RF INGRESS IN FIBER-TO-THE-PREMISES

CROSS REFERENCE TO RELATED APPLICATIONS

This application claims the benefit of the Apr. 18, 2013 filing date of U.S. Ser. No. 61/813,205. The disclosure of U.S. Ser. No. 61/813,205 is hereby incorporated herein by reference.

BACKGROUND

In hybrid fiber coax (hereinafter sometimes HFC) and RF over glass (hereinafter sometimes RFOG) CATV (hereinafter sometimes cable) plant designs, there is a forward path (from the cable company's transmission point to the subscriber's premises) and a return path (from the subscriber's premises back to the cable company's receiving point). The forward path is a trunk-to-branch topology wherein signals are split and split until they reach the subscriber's premises. In contrast, the return path is a combining branch-to-trunk where signals combine until they reach the cable headend. HFC is glass fiber from the headend to distribution points where it is converted to RF, and then RF amplifiers and stretches of coaxial cable to the subscriber's premises. RFOG is basically fiber optic cable to the subscriber, although at the subscriber's premises, the downstream-bound optical signal is converted to RF for decoding by the subscriber's display apparatus, computers, and the like, and, conversely, the upstream-bound signal is converted from RF to optical for transport.

Since subscribers' premises are not the property of the cable operator and signals from many subscriber's premises on a particular node combine in the return band, this section of the cable operator's plant is most subject to noise as every subscriber's premises acts like an antenna and noise accumulates, as in a funnel, until it reaches the cable headend.

Many systems have been designed to assist cable operators to monitor their return band frequency spectrum (for example, 5 to 42 MHz, 5 to 65 MHz, 5 to 85 MHz, or even 5 to 200 MHz) for noise. When noise above a certain threshold is detected, alarms are typically generated, and personnel are dispatched to repair the problem.

In an HFC network, technicians move from branch to branch looking for the noise, narrowing it down until the source is found. In an RFOG network, technicians must go directly to each subscriber's premises individually to search for noise problems. The reason for this is that RFOG has fiber optic cable all the way to the subscriber's premises. There is no RF signal to test except at the subscriber's premises. This makes finding noise problems originating at subscriber's premises somewhat more time consuming and expensive in RFOG architectures.

SUMMARY

At the subscriber's premises, the RFOG is converted back to RF using a so-called RF micronode or optical networking unit (hereinafter collectively sometimes ONU). According to the invention, adjuncts functioning with the ONU can assist in making the search for noise sources in RFOG architectures less difficult.

An on-premise intelligent ingress test module monitors the noise generated by a subscriber's premises. The on-premise intelligent ingress test module acts to reduce or remove noise without CATV system or operator intervention.

The on-premise intelligent ingress test module is initially configured by server software (such as a module of Trilithic ViewPoint™ software). Once configured, the module can: (1) monitor the noise coming out of a subscriber's premises (by monitoring the return band spectrum); (2) enable an attenuator to reduce the noise coming out of the subscriber's premises; (3) disconnect the return band from the subscriber's premises thus cutting all noise; or even (4) power down the ONU, thus taking the subscriber's premises offline.

Furthermore, timers can be built into the module to provide time for self-healing. The module can monitor the noise coming from the subscriber's premises. When the noise has subsided, the module can reconnect the return path or remove the attenuation. This feature is provided because some subscriber's premises emit noise only at certain times, for example, when certain power tools or other devices are operated, making troubleshooting difficult.

Any time the module takes action, the module reports to the server software. With this feature, there is available to the CATV system operator a history of every subscriber's premises showing when subscribers' premises are causing network problems. Technicians can then be dispatched with efficiency.

In an added feature, a module can send periodic return band spectrum scans to the server so that trending data can be analyzed. Preventative measures can be taken based upon this trending data.

In another added feature, the entire return band would be passed through the device. This would permit the module not only to monitor the noise coming from the subscriber's premises but to filter and remove the noise before it reaches the network.

According to an aspect of the invention, a device is provided for permitting a CATV network to perform at least one of the following functions with respect to a CATV subscriber: attenuate the CATV subscriber's return band; deactivate the CATV subscriber's premises' return band; deactivate the CATV subscriber's premises' forward band; and, deactivate the CATV subscriber's premises' network access.

According to an aspect of the invention, a node at a subscriber premises of a communication network includes an I/O port and a device for monitoring the subscriber premises. The device includes a diplex filter including a lowpass filter defining an upstream band and a highpass filter defining a downstream band, a switching device, a decoder having an input/output (I/O) port coupled to the I/O port of the node to receive and decode switching signals from the network, and output ports. The switching device includes a first switch selectively to disconnect the lowpass filter. An output port of the decoder operates the first switch. The decoder is adapted to receive a signal from a signal source to open the first switch, sequentially from subscriber node to subscriber node, sequentially to disconnect the lowpass filters at the subscribers' premises from the network one at a time, and then to close the first switch(es), sequentially to reconnect the subscribers' premises to the network to assist in determining a source of RF noise in the system.

Illustratively according to this aspect, the apparatus further includes a second switch selectively to disconnect the highpass filter. An output port of the decoder operates the second switch. The decoder is adapted to receive a signal from a signal source to open the first switch, the second switch, or both, sequentially from subscriber node to subscriber node, sequentially to disconnect subscribers' premises from the network one at a time, and then to close the switch(es), sequentially to reconnect the subscribers' premises to the network to assist in determining a source of RF noise in the system.

Illustratively according to this aspect, the decoder comprises a decoder providing two-way communication with the network.

Illustratively according to this aspect, the lowpass filter comprises a lowpass filter having a passband of ≥5 MHz and ≤200 MHz.

Illustratively according to this aspect, the highpass filter comprises a highpass filter having a passband of ≥50 MHz and ≤1.8 GHz.

Further illustratively according to this aspect, the apparatus includes a switchable attenuator in series with the lowpass filter. The switchable attenuator is coupled to the decoder and is switchable via the decoder under control of switching signals from the network.

Further illustratively according to this aspect, the apparatus includes a power inserter for supplying power to the node and the decoder, and circuit components for isolating the lowpass filter and the highpass filter from the power inserter.

Further illustratively according to this aspect, the apparatus includes a power control circuit controlling a third switch. The power control circuit and the third switch are under the control of switching signals from the network to control the node.

Further illustratively according to this aspect, the apparatus includes a pushbutton switch to reset the circuit and third switch, restoring the power supply to the node.

Illustratively according to this aspect, the node comprises a fiberoptic-to-RF/RF-to-fiberoptic node.

Alternatively illustratively according to this aspect, the node comprises a node of a hybrid fiber coaxial (HFC) communication network.

According to another aspect of the invention, in a communication network, a node at a subscriber premises includes an input/output (I/O) port and a device for monitoring a subscriber premises. The device includes an upstream signal path including a first switch, a downstream signal path, and a controller having an input/output (I/O) port coupled to the I/O port of the node, and a first output port. The first switch is coupled to the first output port selectively to complete the upstream signal path.

Illustratively according to this aspect, the device further includes an attenuator. The first switch controls whether the attenuator is in the upstream signal path or not.

Illustratively according to this aspect, the controller includes a processor having an input port coupled in the upstream signal path to monitor the upstream signal path.

Further illustratively according to this aspect, the apparatus includes an analog-to-digital converter (A/D) coupled between the upstream signal path and the input port of the processor to A/D convert the signal in the upstream signal path for processing by the processor.

Illustratively according to this aspect, the processor comprises a filter for filtering noise from the signal in the upstream signal path.

Further illustratively according to this aspect, the apparatus comprises a digital-to-analog converter (D/A) coupled between the I/O port of the controller and the I/O port of the node.

Illustratively according to this aspect, the controller includes a processor having an input port. The apparatus further includes an analog-to-digital converter (A/D) coupled between the downstream signal path and the input port of the processor to A/D convert the signal in the downstream signal path for processing by the processor.

Further illustratively according to this aspect, the apparatus includes a bandpass filter coupled between the downstream signal path and the second A/D.

Further illustratively according to this aspect, the downstream signal path includes a second switch. The controller includes a second output port. The second switch is coupled to the second output port selectively to complete the downstream signal path.

Illustratively according to this aspect, the controller comprises a controller providing two-way communication with the network.

Illustratively according to this aspect, the upstream signal path comprises a lowpass filter having a passband of ≥5 MHz and ≤200 MHz.

Illustratively according to this aspect, the downstream signal path comprises a highpass filter having a passband of ≥50 MHz and ≤1.8 GHz.

Further illustratively according to this aspect, the apparatus includes a switchable attenuator in the upstream signal path. The switchable attenuator is coupled to the controller and is switchable via the controller under control of switching signals from the network.

Further illustratively according to this aspect, the apparatus includes a power inserter for supplying power to the node and the controller, and circuit components for isolating the upstream signal path and the downstream signal path from the power inserter.

Further illustratively according to this aspect, the apparatus includes a power control circuit controlling a third switch. The power control circuit and the third switch are under the control of switching signals from the network to control the node.

Further illustratively according to this aspect, the apparatus includes a pushbutton switch to reset the circuit and third switch, restoring the power supply to the node.

Illustratively according to this aspect, the node comprises a fiberoptic-to-RF/RF-to-fiberoptic node.

Alternatively illustratively according to this aspect, the node comprises a node of a hybrid fiber coaxial (HFC) communication network.

According to another aspect of the invention, a device permits a CATV network to perform at least one of the following functions with respect to a CATV subscriber: attenuate the CATV subscriber's return band; deactivate the CATV subscriber's premises' return band; deactivate the CATV subscriber's premises' forward band; and, deactivate the CATV subscriber's premises' network access.

BRIEF DESCRIPTION OF THE DRAWINGS

The invention may best be understood by referring to the following detailed description and accompanying drawings. In the drawings.

DETAILED DESCRIPTIONS OF ILLUSTRATIVE EMBODIMENTS

Figure 1:
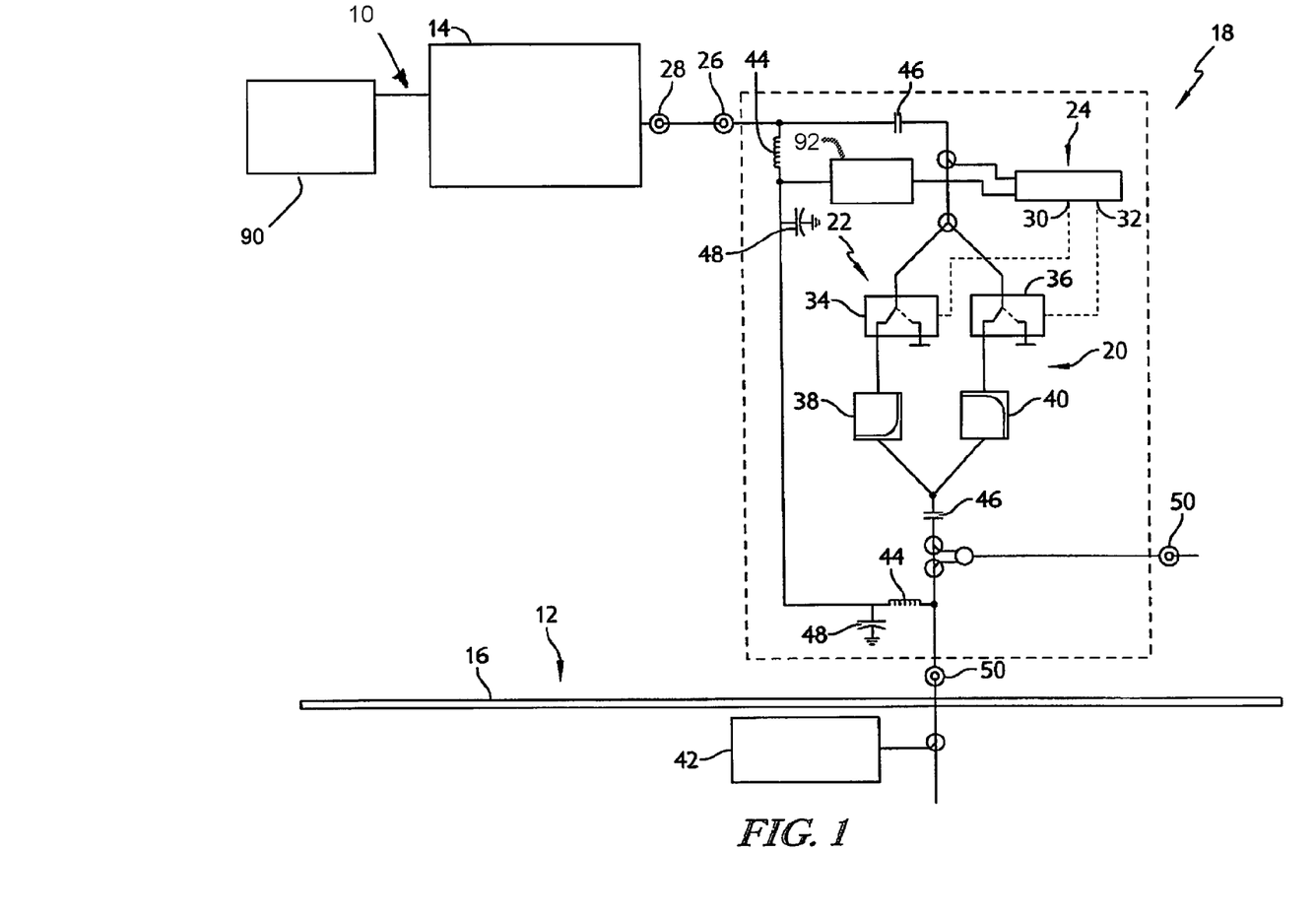
FIG. 1 illustrates a partly block and partly schematic drawing of an embodiment of the invention.

In optical fiber-to-subscriber communication networks 10, such as, for example, combined CATV/Internet/VOIP systems, coupling to individual devices in the subscriber premises 12 is achieved by RF. RF transceivers on each device in the subscriber premises 12 receive downstream-bound traffic from, and transmit upstream-bound traffic to, a fiberoptic-to-RF/RF-to-fiberoptic node 14 which may be mounted, for example, on an outside wall 16 of the subscriber premises 12. Such a node 14 could be, for example, an AllOptic MicroNode™ optical network unit (ONU). Of concern in such situations is that the subscriber premises 12, a home, for example, may be an "RF-noisy" environment, which, of course, may interfere with both downstream-bound and upstream-bound communication. As these signals are combined for return upstream, all attached nodes, for example, 32 nodes, are affected by these noisy signals.

A device 18 for monitoring a subscriber premises 12 includes a diplex filter 20, a switching device 22 and a decoder 24. An input/output (I/O) port 26 of the decoder 24 is coupled to an I/O port 28 of the node 14 to receive and decode switching signals from the network 10, for example, a CATV/Internet/VOIP network 10. Output ports 30, 32 of the decoder 24 operate switches 34, 36, respectively, in the switching device 22 to disconnect either the upstream bound output from a lowpass filter 38 in the diplex filter 20, or the downstream bound input to a highpass filter 40 in the diplex filter 20, or both. The passband of filter 38 may be, for example 5 MHz-42 MHz, 5 MHz-65 MHz, or 5 MHz-85 MHz. The passband of filter 40 may be, for example, 50 MHz-1.8 GHz, 80 MHz-1.8 GHz or 110 MHz-1.8 GHz.

The decoder 24 can then be signaled to close the switch(es) 34 and/or 36, reconnecting the subscriber's premises 12 to the network 10. This can be done from the headend or other suitable location 90 sequentially from subscriber node 14 to subscriber node 14 by providing control signals to the subscriber nodes 14s' decoders 24. In this way, subscriber premises 12 can be disconnected from the network 10 one at a time to assist in determining the source(s) of RF noise in the system. This (these) RF noise source(s) can then be addressed by (a) service technician(s).

The illustrated switches 34, 36 are RF single pole double throw switches. The output port of each switch which is not coupled to the diplex filter 20 may need to be terminated in a dummy load. Power for the illustrated system may be provided from a power inserter 42 through series inductors 44 to the node 14, the decoder 24 and other circuitry requiring power. Capacitors 46 keep the power off the RF signal path. Capacitors 48 reduce ripple and store charge. One or more test points 50 may be provided for monitoring signal flow in one or the other direction, or both.

Figure 2:
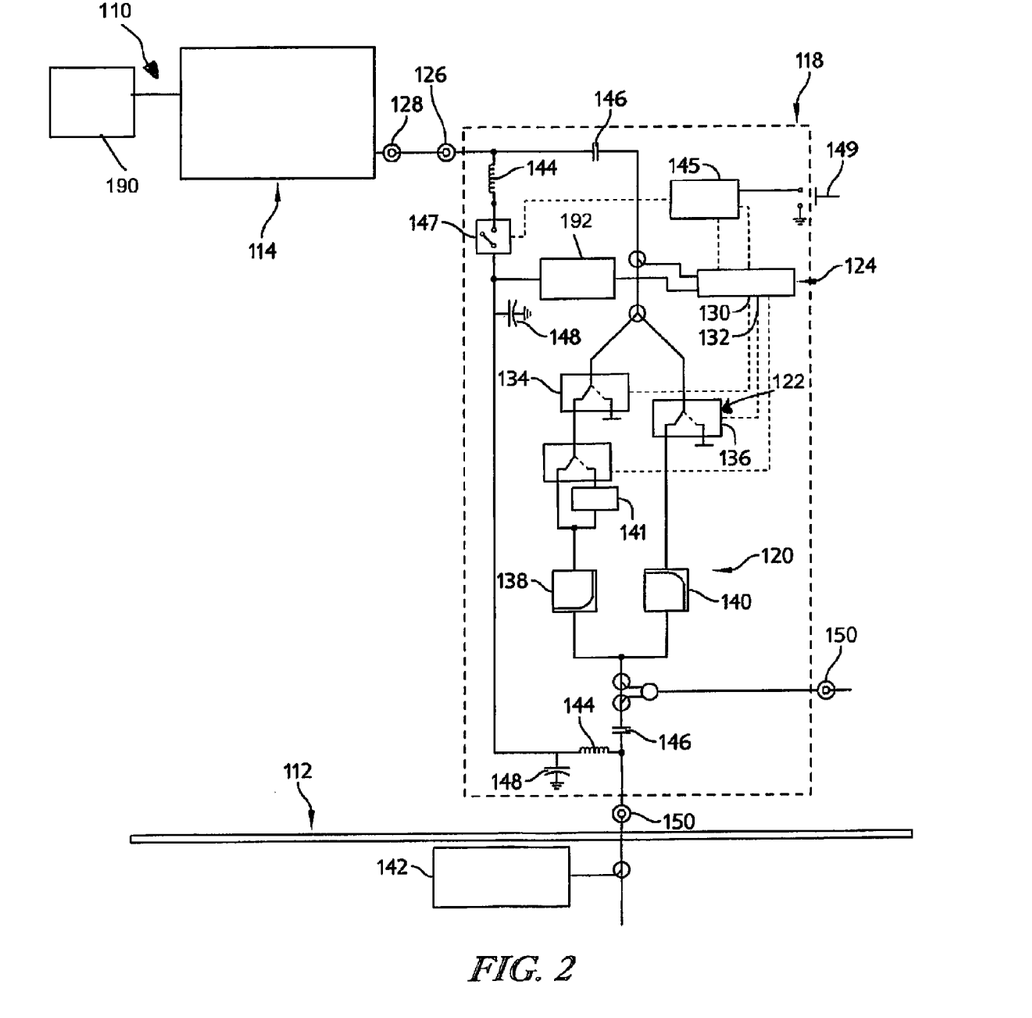
FIG. 2 illustrates a partly block and partly schematic drawing of another embodiment of the invention.

In another embodiment, a device 118 for monitoring a subscriber premises 112 includes a diplex filter 120, a switching device 122 and a decoder 124. Decoder 124 provides two-way communication with network 110, facilitating, for example, a command/acknowledge architecture or format. An I/O port 126 of the decoder 124 is coupled to an I/O port 128 of the node 114 to receive and decode switching signals from the network 110, again, for example, a CATV/Internet/VOIP network. Output ports 130, 132 of the decoder 124 operate switches 134, 136, respectively, in the switching device 122 to disconnect either the upstream-bound output from a lowpass filter 138 in the diplex filter 120, or the downstream-bound input to a highpass filter 140 in the diplex filter 120, or both. The passband of filter 138 may be, for example 5 MHz-42 MHz, 5 MHz-65 MHz, or 5 MHz-200 MHz. The passband of filter 140 may be, for example, 50 MHz-1.8 GHz, 80 MHz-1.8 GHz or 110 MHz-1.8 GHz. In this embodiment, the return band path includes a switchable attenuator 141, for example, a 6 dB switchable attenuator, switchable via the decoder 124 under control of switching signals from the network 110.

The decoder 124 can then be signaled to close the switch(es) 134 and/or 136, reconnecting the subscriber's premises 112 to the network 110. This can be done from the headend or other suitable location 190 sequentially from subscriber node 114 to subscriber node 114 by providing control signals to the subscriber nodes 114s' decoders 124. In this way, subscriber premises 112 can be disconnected from the network 110 one at a time to assist in determining the source(s) of RF noise in the system. This (these) RF noise source(s) can then be addressed by (a) service technician(s).

The illustrated switches 134, 136 are RF single pole double throw switches. The output port of each switch which is not coupled to the diplex filter 120 may need to be terminated in a dummy load. Power is provided from a power inserter 142 through series inductors 144 to the node 114, the decoder 124 and other circuitry requiring power. Power control to deactivate and reactivate the ONU is provided from a circuit 145, here, a one-shot, controlling a switch 147. Circuit 145 and thus switch 147 are under the control of switching signals from the network 110 via decoder 124. Device 118 also includes a pushbutton switch 149 to reset circuit 145 and switch 147, restoring the power supply 192 to node 114. Capacitors 146 keep the power from the RF signal path. Capacitors 148 reduce ripple and store charge. One or more test points 150 may be provided for monitoring signal flow in one or the other direction, or both.

Figure 3:
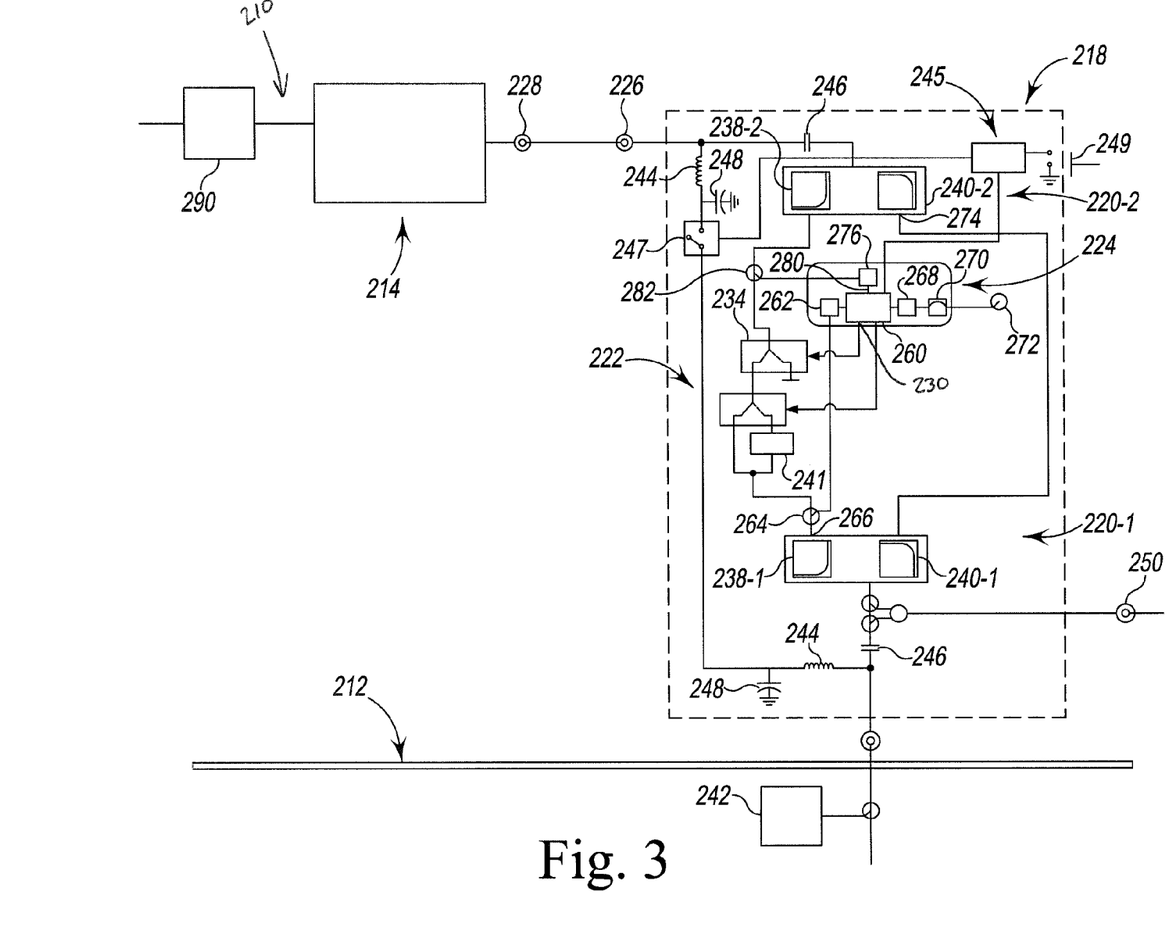
FIG. 3 illustrates a partly block and partly schematic drawing of another embodiment of the invention; and, FIG. 4 illustrates a partly block and partly schematic drawing of another embodiment of the invention.

In another embodiment, a device 218 for monitoring a subscriber premises 212 includes two diplex filters 220-1, 220-2, a switching device 222 and an on-premise intelligent ingress test module (hereinafter sometimes module) 224. Module 224 will be explained in more detail below. An I/O port 226 of module 224 is coupled to an I/O port 228 of the node 214 to receive and decode switching signals from the network 210, again, for example, a CATV/Internet/VOIP network. Output port 230 of module 224 operates switch 234 in the switching device 222 to disconnect the upstream bound output from a lowpass filter 238-1 in a diplex filter 220-1. The passbands of return, or upstream, band filters 238-1, 238-2 in diplex filters 220-1, 220-2 may be, for example 5 MHz-42 MHz, 5 MHz-65 MHz, 5 MHz-85 MHz or 5 MHz-200 MHz. The passbands of downstream band filters 240-1, 240-2 in diplex filters 220-1, 220-2 may be, for example, 50 MHz-1.8 GHz, 80 MHz-1.8 GHz, 110 MHz-1.8 GHz or 220 MHz-1.8 GHz. In this embodiment, the return band path includes a switchable attenuator 241, for example, a 6 dB switchable attenuator, switchable via module 224.

Module 224 can be controlled by switching signals from the network 210 to close the switch 234, reconnecting the subscriber's premises 212 to the network 210. This can be done from the headend or other suitable location 290 sequentially from subscriber node 214 to subscriber node 214 by providing control signals to the subscriber nodes 214s' on-premise intelligent ingress test module 224. In this way, subscriber premises 212 can be disconnected from the network 210 one at a time to assist in determining the source(s) of RF noise in the system. This (these) RF noise source(s) can then be addressed by (a) service technician(s).

Module 224 also has "smart" capability. That is, module 224 monitors the noise generated by subscriber's premises 212. The module 224 acts to reduce, via attenuator 241, or remove, via switch 234, noise without CATV system or operator intervention. Module 224 is initially configured by server software (such as a module of Trilithic ViewPoint™ software). Once configured, the module 224 can: (1) monitor the noise coming out of a subscriber's premises 212 (by monitoring the return band spectrum); (2) enable the attenuator 241 to reduce the noise coming out of the subscriber's premises 212; (3) disconnect, via switch 234, the return band from the subscriber's premises 212, thus cutting all noise; or even (4) power down the ONU, thus taking the subscriber's premises 212 offline.

Module 224 includes a field-programmable gate array (FPGA) 260 for signal processing, and an analog-to-digital (A/D) converter 262 for providing to FPGA 260 upstream-bound content from a tap 264 on an output port 266 of lowpass filter 238-1. Module 224 also includes an A/D 268 for providing bandpass 270 filtered downstream-bound content from a tap 272 on an output port 274 of highpass filter 240-2. Bandpass filter 270 has a passband of, for example, 80 MHz-100 MHz, 100 MHz-120 MHz, or the like. Bandpass filter 270 reduces the performance requirement on A/D 268, permitting a less expensive A/D to be used in this position. Digital output from a digital-to-analog (D/A) converter 276 coupled to an output port 280 of FPGA 260 is inserted into the upstream by a combiner 282. Switch 234 and attenuator 241 are controlled by outputs from module 224.

Timers can be built into module 224 to provide time for self-healing. Module 224 can monitor the noise coming from the subscriber's premises 212. This feature is provided because some subscribers' premises 212 are noisy only at certain times, for example, when certain power tools or other devices are operated, making troubleshooting difficult. When the noise has subsided, module 224 can reconnect the return path 234 or remove the attenuation 241.

Any time module 224 takes action, module 224 reports to the server software the action module 224 has taken. With this feature, a history of every device 218-equipped subscriber's premises 212 showing when subscribers' premises 212 have caused network problems, is available to the CATV system operator. This history assists in dispatching technicians efficiently.

As an optional feature, module 224 can send periodic return band spectrum scans to the server so that data can be analyzed for trends. Preventative measures can be taken based upon this trending data.

As another optional feature, the entire return band may be passed through module 224. Module 224 would then not monitor the noise coming from the subscriber's premises 212, but rather would filter the return band and remove the noise before the noise reaches the upstream path in the network 210.

As with the embodiments illustrated in FIGS. 1-2, the embodiment illustrated in FIG. 3 includes a power inserter 242 through series inductors 244 to the node 214, the module 224 and other circuitry requiring power. Power control to deactivate and reactivate the ONU 214 is provided from a circuit 245, here, a one-shot, controlling a switch 247. Circuit 245 and thus switch 247 are under the control of switching signals from module 224, as well as from the network 210 via module 224. Device 218 also includes a pushbutton switch 249 to reset circuit 245 and switch 247, restoring the power supply 292 to node 214. Capacitors 246 keep the power from the RF signal path. Capacitors 248 reduce ripple and store charge. One or more test points 250 may be provided for monitoring signal flow in one or the other direction, or both.

Figure 4:
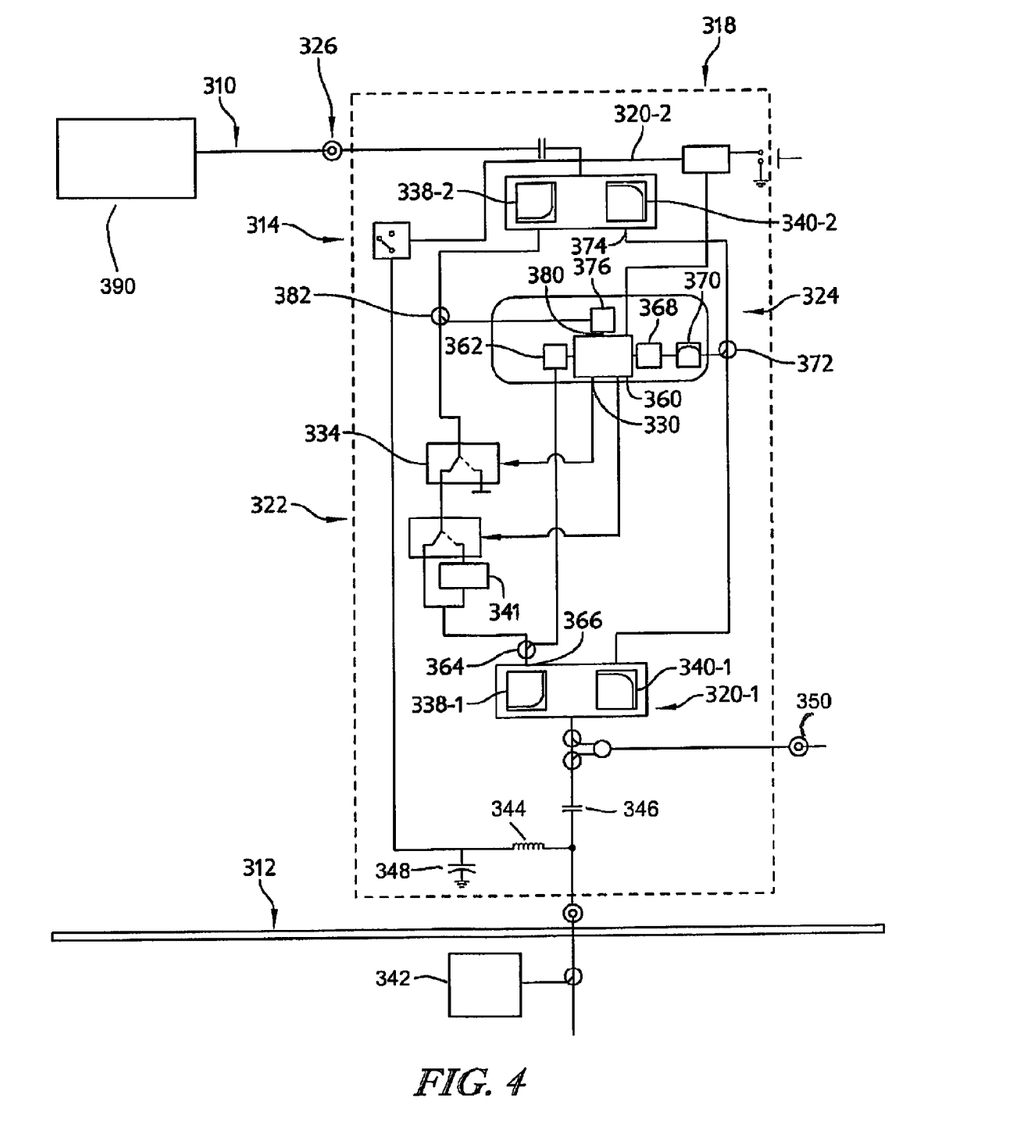

In another embodiment for use in HFC rather than RFOG, a device 318 for monitoring a subscriber premises 312 includes two diplex filters 320-1, 320-2, a switching device 322 and an on-premise intelligent ingress test module (hereinafter sometimes module) 324. An I/O port 326 of module 324 is coupled to receive and decode switching signals from the network 310, again, for example, a CATV/InternetNOIP network. Output port 330 of module 324 operates switch 334 in the switching device 322 to disconnect the upstream bound output from a lowpass filter 338-1 in a diplex filter 320-1. The passbands of return, or upstream, band filters 338-1, 338-2 in diplex filters 320-1, 320-2 may be, for example 5 MHz-42 MHz, 5 MHz-65 MHz, 5 MHz-85 MHz or 5 MHz-200 MHz. The passbands of downstream band filters 340-1, 340-2 in diplex filters 320-1, 320-2 may be, for example, 50 MHz-1.8 GHz, 80 MHz-1.8 GHz, 110 MHz-1.8 GHz or 220 MHz-1.8 GHz. The return band path includes a switchable attenuator 341, for example, a 6 dB switchable attenuator, switchable via module 324.

Module 324 can be controlled by switching signals from the network 310 to close the switch 334, reconnecting the subscriber's premises 312 to the network 310. This can be done from the headend or other suitable location 390 sequentially from subscriber node 314 to subscriber node 314 by providing control signals to the subscriber nodes 314s' on-premise intelligent ingress test module 324. In this way, subscriber premises 312 can be disconnected from the network 310 one at a time to assist in determining the source(s) of RF noise in the system. This (these) RF noise source(s) can then be addressed by (a) service technician(s).

Module 324 also has "smart" capability. That is, module 324 monitors the noise generated by subscriber's premises 312. The module 324 acts to reduce, via attenuator 341, or remove, via switch 334, noise without CATV system or operator intervention. Module 324 is initially configured by server software (such as a module of Trilithic ViewPoint™ software). Once configured, the module 324 can: (1) monitor the noise coming out of a subscriber's premises 312 (by monitoring the return band spectrum); (2) enable the attenuator 341 to reduce the noise coming out of the subscriber's premises 312; or (3) disconnect, via switch 334, the return band from the subscriber's premises 312, thus cutting all noise.

Module 324 includes an FPGA 360 for signal processing, and an analog-to-digital (A/D) converter 362 for providing to FPGA 360 upstream-bound content from a tap 364 on an output port 366 of lowpass filter 338-1. Module 324 also includes an A/D 368 for providing bandpass 370 filtered downstream-bound content from a tap 372 on an output port 374 of highpass filter 340-2. Bandpass filter 370 has a passband of, for example, 80 MHz-100 MHz, 100 MHz-120 MHz, or the like. Bandpass filter 370 reduces the performance requirement on A/D 368, permitting a less expensive A/D to be used in this position. Digital output from a digital-to-analog (D/A) converter 376 coupled to an output port 380 of FPGA 360 is inserted into the upstream by a combiner 382. Switch 334 and attenuator 341 are controlled by outputs from module 324.

Timers can be built into module 324 to provide time for self-healing. Module 324 can monitor the noise coming from the subscriber's premises 312. This feature is provided because some subscribers' premises 312 are noisy only at certain times, for example, when certain power tools or other devices are operated, making troubleshooting difficult. When the noise has subsided, module 324 can reconnect the return path 334 or remove the attenuation 341.

Any time module 324 takes action, module 324 reports to the server software the action module 324 has taken. With this feature, a history of every device 318-equipped subscriber's premises 312 showing when subscribers' premises 312 have caused network problems, is available to the CATV system operator. This history assists in dispatching technicians efficiently.

As an optional feature, module 324 can send periodic return band spectrum scans to the server so that data can be analyzed for trends. Preventative measures can be taken based upon this trending data.

As another optional feature, the entire return band may be passed through module 324. Module 324 would then not monitor the noise coming from the subscriber's premises 312, but rather would filter the return band and remove the noise before the noise reaches the upstream path in the network 310.

As with the embodiments illustrated in FIGS. 1-3, the embodiment illustrated in FIG. 4 includes a power inserter 342 through series inductors 344 to the node 314, the module 324 and other circuitry requiring power. Capacitors 346 keep the power from the RF signal path. Capacitors 348 reduce ripple and store charge. One or more test points 350 may be provided for monitoring signal flow in one or the other direction, or both.

While diplex filters 20, 120, 220-1, 220-2, 320-1, 320-2 are employed in the illustrated embodiments, it may be that diplex filters are not essential to the practice of the invention. The diplex filters 20, 120, 220-1, 220-2, 320-1, 320-2 may be replaced by splitters. It should also be understood that while ONU 14, 114, 214 and device 18, 118, 218 are illustrated as separate components, they may be packaged in a common housing, and may indeed by laid out on (a) common circuit board(s), and share components, such as power supplies and the like.

What is claimed is:

1. A system comprising:
    a signal source operable to send a control signal over a communication network,
    a plurality of subscriber nodes connected to the communication network, each subscriber node being located at a subscriber premises and including an I/O port, and
    a plurality of devices, each device being coupled to at least one subscriber node of the plurality of subscriber nodes at a subscriber premises for monitoring the subscriber premises, each device including:
    (i) a diplex filter including an upstream filter defining an upstream band and a downstream filter defining a downstream band,
    (ii) a test module having an output port and an input/output (I/O) port coupled to the I/O port of the at least one subscriber node to receive and decode switching signals from the communication network,
    (iii) a switching device including a first switch operable to selectively disconnect the upstream filter based on signals from the output port of the test module,
    (iv) a power control circuit controlling a third switch, the power control circuit and the third switch being under the control of switching signals from the network to control the node, and
    (v) a pushbutton switch to reset the power control circuit and the third switch, restoring the power supply to the node,
    wherein the signal source is operable to send the control signal to the test module of each device sequentially at each subscriber node to sequentially disconnect and reconnect each subscriber's premises to the communications network to selectively isolate each subscriber's premises from the signal source,
    wherein the test module of each device is adapted to open the first switch, to disconnect the upstream filter at a subscribers' premises from the communication network and then to close the first switch to reconnect the subscribers' premises to the communication network in response to the control signal from the signal source, and
    wherein the test module of each device is configured to monitor noise output from the upstream filter to assist in determining a source of RF noise in the system.

2. The apparatus of claim 1 wherein the node comprises a node of a hybrid fiber coaxial (HFC) communication network.

3. The apparatus of claim 1 wherein the test module is configured to provide two-way communication with the communication network.

4. The apparatus of claim 1 wherein the upstream filter comprises an upstream filter having a passband of ≥5 MHz and ≤200 MHz.

5. The apparatus of claim 1 wherein the downstream filter comprises a downstream filter having a passband of ≥50 MHz and ≤1.8 GHz.

6. The apparatus of claim 1 further including a switchable attenuator in series with the upstream filter, the switchable attenuator coupled to the test module and switchable via the test module under control of switching signals from the network.

7. The apparatus of claim 1 further including circuit components for isolating the upstream filter and the downstream filter from the power inserter.

8. The apparatus of claim 1 wherein the node comprises a fiberoptic-to-RF/RF-to-fiberoptic node.

9. In a communication network,
    a node located at a subscriber premises, the node including an input/output (I/O) port,
    a device coupled to the node at the subscriber premises for monitoring the subscriber premises, the device including:
    (i) an upstream signal path including a first switch operable to open and close the upstream signal path,
    (ii) a downstream signal path,
    (iii) a controller having an output port and an input/output (I/O) port coupled to the I/O port of the node, the controller being operable to monitor noise signals in the upstream signal path,
    (iv) a power control circuit, controlling a third switch, the power control circuit and the third switch being under the control of switching signals from the network to control the node, and
    (v) a pushbutton switch to reset the power control circuit and the third switch, restoring the power supply to the node,
    wherein the first switch is coupled to the output port of the controller, and the controller is operable to send control signals to the first switch based on the noise signals generated at the subscriber's premises to selectively open the upstream signal path to prevent noise signals generated at the subscriber premises from passing to the node.

10. The apparatus of claim 9 wherein the upstream signal path includes an attenuator, the first switch controlling whether the attenuator is in the upstream signal path or not.

11. The apparatus of claim 9 wherein the controller is configured to provide two-way communication with the network.

12. The apparatus of claim 9 wherein the upstream signal path comprises a lowpass filter having a passband of ≥5 MHz and ≤200 MHz.

13. The apparatus of claim 9 wherein the downstream signal path comprises a highpass filter having a passband of ≥50 MHz and ≤1.8 GHz.

14. The apparatus of claim 9 further including a switchable attenuator in the upstream signal path, the switchable attenuator coupled to the controller and switchable via the controller under control of switching signals from the network.

15. The apparatus of claim 9 further including
   circuit components for isolating the upstream signal path and the downstream signal path from the power inserter.

16. The apparatus of claim 9 wherein the node comprises a fiberoptic-to-RF/RF-to-fiberoptic node.

\* \* \* \* \*